(12) United States Patent
Hashizume et al.

(10) Patent No.: US 6,661,604 B2
(45) Date of Patent: Dec. 9, 2003

(54) PLATE-LIKE APPARATUS, ROTATING BODY BUILT-IN DEVICE, AND DISK DEVICE

(75) Inventors: Masataka Hashizume, Fujisawa (JP); Hiroki Kitahori, Kanagawa-ken (JP); Hiroshi Matsuda, Kanagawa-ken (JP); Satoshi Matsumura, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/884,309

(22) Filed: Jun. 18, 2001

(65) Prior Publication Data

US 2002/0030921 A1 Mar. 14, 2002

(30) Foreign Application Priority Data

Jun. 16, 2000 (JP) ........................................ 2000-181293

(51) Int. Cl.[7] .................... G11B 33/14; B65D 81/02; H05K 5/00
(52) U.S. Cl. ...................... 360/97.02; 206/586; 361/685
(58) Field of Search .......................... 360/97.01, 97.02; 369/75.1; 206/586; 361/685

(56) References Cited

U.S. PATENT DOCUMENTS

| 4,496,054 A | * | 1/1985 | Koltun ........................ 206/586 |
| 5,529,503 A | * | 6/1996 | Kerklaan .................... 439/76.1 |
| 5,535,092 A | * | 7/1996 | Bang .......................... 361/685 |
| 5,673,158 A | * | 9/1997 | Ichimura ................... 360/97.01 |
| 5,703,734 A | * | 12/1997 | Berberich et al. ........ 360/97.02 |
| 2001/0012175 A1 | * | 8/2001 | Williams et al. .......... 360/97.01 |

FOREIGN PATENT DOCUMENTS

| GB | 2343544 A | * | 5/2000 | ........... G11B/33/08 |
| JP | 01014786 A | * | 1/1989 | ........... G11B/23/03 |
| JP | 03083282 A | * | 4/1991 | ........... G11B/33/08 |
| JP | 07110726 A | * | 4/1995 | ............. G06F/1/16 |
| JP | 08057827 A | * | 3/1996 | ............. B28B/7/00 |
| JP | 08069687 A | * | 3/1996 | ........... G11B/33/08 |
| JP | 10322039 A | * | 12/1998 | ............. H05K/5/02 |
| JP | 11-353865 | | 12/1999 | |
| JP | 2000149536 A | * | 5/2000 | ........... G11B/33/08 |
| WO | WO 9634390 A1 | * | 10/1996 | ........... G11B/33/08 |

\* cited by examiner

*Primary Examiner*—William Klimowicz
(74) *Attorney, Agent, or Firm*—Robert B. Martin; Bracewell & Patterson, L.L.P.

(57) ABSTRACT

The present invention provides an improved magnetic data storage and retrieval system, which can absorb external shock and is easily attached to a host system. By setting bumpers in the four corners of a magnetic data storage and retrieval system, external shock can be absorbed to prevent a magnetic disk from being displaced from the proper alignment with its spindle motor. With this arrangement, in the two corners on the end portion side of a guide groove formed in the base, pedestal surfaces are formed in one side of the guide groove, and plate-like bumpers and are set on the pedestals. Further, in the remaining two corners, insertion-type bumpers may be set and a label covering part of them may be affixed.

13 Claims, 14 Drawing Sheets

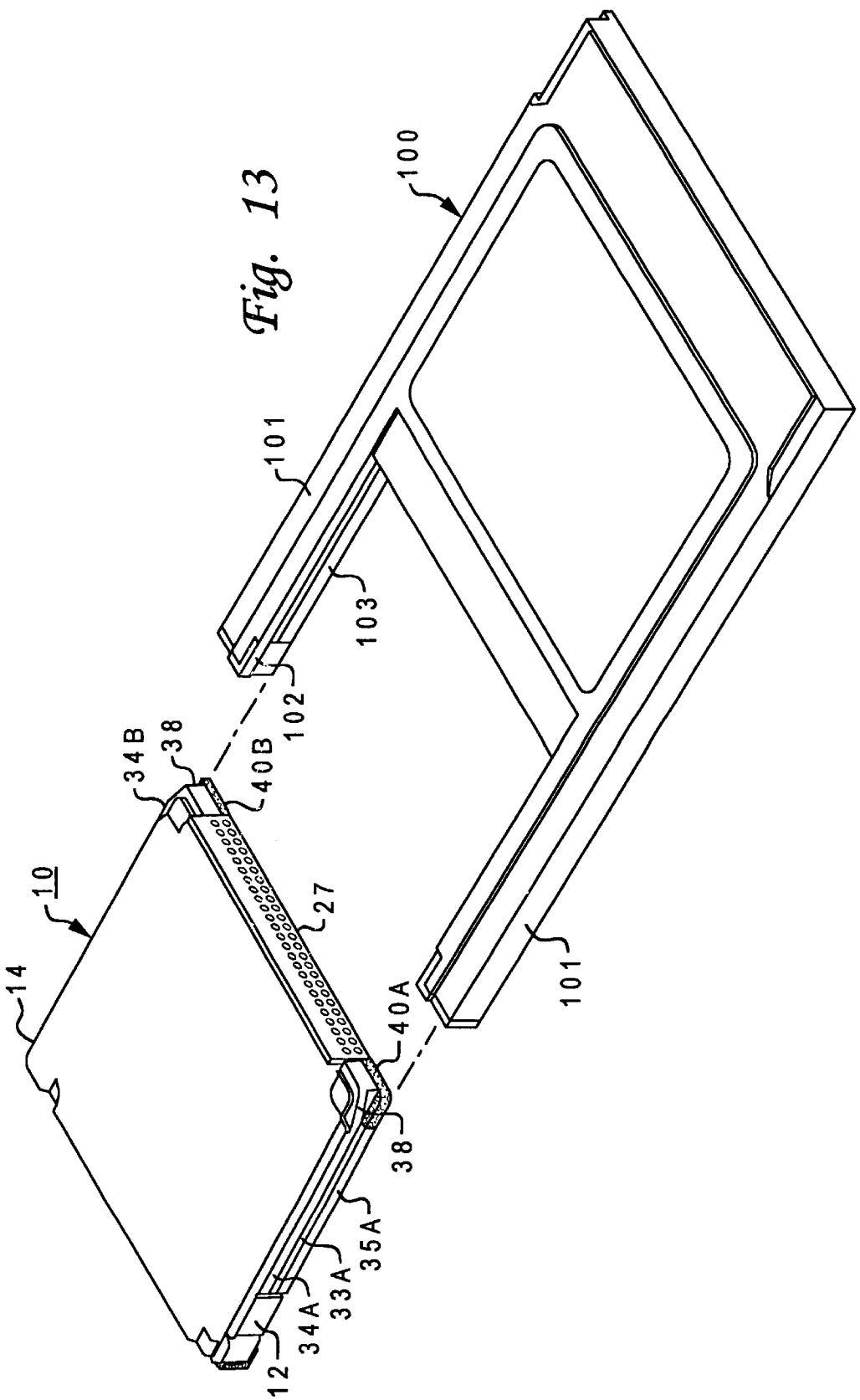

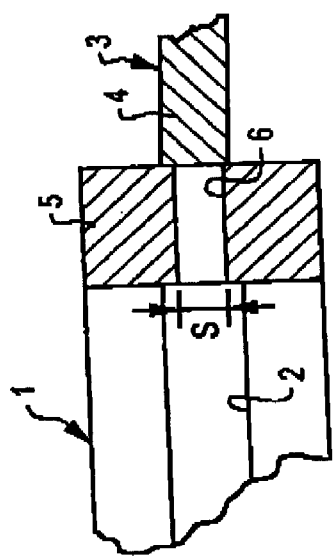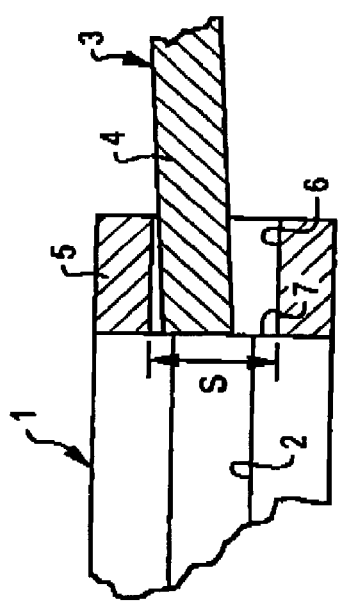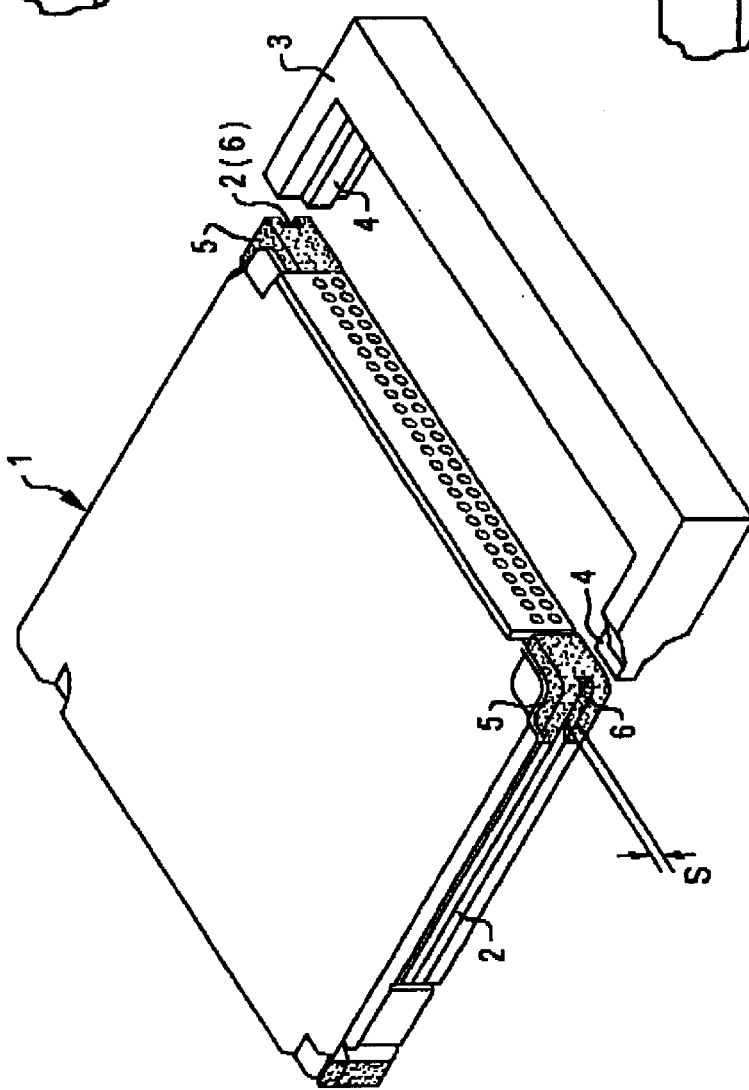

PLATE-LIKE APPARATUS, ROTATING BODY BUILT-IN DEVICE, AND DISK DEVICE

BACKGROUND OF THE INVENTION

1. Technical Field

The present invention relates to a plate-like apparatus, integral rotating body device, and disk device, which are used as a magnetic data storage and retrieval system.

2. Description of the Related Art

Various devices, ranging from data processing systems to optical data capture systems, employ portable or removable storage media to accommodate and retain data. The last few years have witnessed an ongoing and well-publicized effort toward miniaturizing and increasing the capacity of these storage media.

Much of the development in the miniaturization and capacity improvement of storage media has resulted in improvements in magnetic data storage and retrieval systems, commonly referred to as hard disk drives. A magnetic data storage and retrieval system frequently comprises an annular, magnetic disk for storing data (hereinafter simply referred to as a "disk"), a spindle motor, which rotates the disk, a read/write head, which reads/writes data from/to the disk, an actuator, which drives the read/write head in a direction radial to the disk, and other, related equipment and circuitry.

Attempts to miniaturize magnetic data storage and retrieval systems have required very precise construction of mechanical structures such as the disk, spindle motor, read/write head, and actuator. Accordingly, mechanical shock events such as dropping or bumping the magnetic data storage and retrieval system against a solid object frequently result in malfunctions. In particular, mechanical shock events that result in a misalignment of the disk with respect to the center of rotation of the spindle motor may compromise the ability of the read/write head to read or write data from or to the disk.

Common disk designs connect the rotating shaft of the spindle motor to the disk through the disk's central hole. The size of the central hole is designed to allow a clearance (between the inner edge of the disk and the rotating shaft of the spindle motor) for ease of insertion during assembly. Clamp, screw, or other articulating hardware affixes the disk to the rotating shaft of the spindle motor. Data is recorded on the disk by the read/write head while the disk is rotated by the spindle motor. This is accomplished by recording the data in concentric tracks. If a shock event of a magnitude greater than the magnitude of the frictional forces between the disk, the rotating shaft, and the articulating hardware occurs, the center of the disk may become displaced within the clearance between the disk and the rotating shaft with respect to the center of rotation of the spindle motor. As a result, the read/write head may be unable to read or write data from or to the disk.

The proposed, partial solution discussed in Published Unexamined Patent Application No. 11-353865 deals with the displacement problem by mounting bumpers, composed of an elastic material, on corner portions of a magnetic data storage and retrieval device. If the magnetic data storage and retrieval device is dropped, the bumpers can absorb the energy of the shock event to prevent the displacement of the disk. In a magnetic data storage and retrieval system shaped as a rectangular plate of predetermined thickness, such as Compact Flash (a registered trademark), such bumpers are naturally most effective when attached to the four corners of the magnetic data storage and retrieval system.

The example of Compact Flash, however, illustrates the deficiencies, limitations, and inadequacies of the prior art. Compact Flash calls for a guide groove on each side, thereby allowing mounting on a data processing system, a unit of peripheral equipment such as digital camera, or an articulating adapter. The technique described in the above referenced publication fails to accommodate this guide groove. Further innovations in the design of magnetic data storage and retrieval systems are necessary in order to allow the technique described above to effectively accommodate the requirements of guide-groove designs such as Compact Flash.

Examination of the problem described above indicates that, as shown in FIG. 15, the magnetic data storage and retrieval system 1 attached to a data processing system or peripheral device, and the guide portion 3 on the adapter side include a guide groove 2 corresponding to the projection 4 of the guide 3 so that at least one end thereof continues to the corner of the magnetic data storage and retrieval system 1. Attachment of a bumper 5 to the corner requires formation of a groove portion 6 corresponding to the guide 2.

However, because the bumper 5 is usually formed from an elastomeric material to achieve shock absorbing properties, it is difficult to size the groove portion 6 (S in FIG. 15) precisely when the bumper 5 is molded. As shown in FIG. 16A, if the size S of the groove portion 6 is substantially smaller than the size of the guide groove 2, substantial friction exists between the groove portion 6 of the bumper 5 and the projection 4 of the guide portion 3 when the magnetic data storage and retrieval system 1 is inserted into or removed from the guide portion 3. This friction complicates insertion and removal of the magnetic data storage and retrieval system by requiring substantial force to overcome the frictional force at insertion and removal. Further, as shown in FIG. 16B, if the size S of the groove portion 6 is excessively large relative to the size of the guide groove 2, the projection 4 of the guide portion 3 can be blocked by the step 7 between the groove portion 6 of the bumper 5 and the guide groove 2 when the magnetic data storage and retrieval system 1 is set in the guide portion 3.

The present invention solves the problems described above, and its object is to provide a plate-like apparatus, integral rotating body device, and magnetic data storage and retrieval system, which can absorb the energy of an external shock event and can be easily attached.

SUMMARY OF THE INVENTION

The plate-like apparatus of the present invention, designed to account for the problems described above, is attachable to and detachable from a loading object having a pair of guide portions, and it has a guide groove on each side of the rectangular plate-like apparatus body. In the two corners where these guide grooves are formed, a shock absorbing member projecting beyond the apparatus body is provided on one side in the thickness direction of the apparatus body. If such a plate-like apparatus is dropped, the projection of the shock absorbing member beyond the apparatus body causes it to contact the impact surface before the remainder of the apparatus body. This design can effectively absorb the shock applied to the whole apparatus.

As an example of such a plate-like apparatus, consider one constructed so as to comply with the Compact Flash standard, and as an exemplary loading object, consider various devices such as a data processing system, a digital camera, or a memory player. One can also envision application of the present invention to an adapter used to attach the plate-like apparatus to various devices, such as a PC card.

Such a plate-like apparatus has a pair of guide grooves for attachment to the loading object, and each guide groove is formed so that at least one end thereof reaches a corner of the apparatus body. Both ends of the guide groove may reach the corners of the apparatus body. In the case where both ends of the guide groove reach the corners of the apparatus body, the design need only provide shock absorbing members in the corners at both ends. If only one end of the guide groove reaches the corner of the apparatus body, another shock absorbing member, covering a whole corner, may be provided in the remaining two corners where no guide groove exists.

Another consideration arises from the fact that, in Compact Flash and similar devices, the guide grooves formed in the two sides of the plate-like apparatus have different widths. Such a design may require pedestal surfaces meeting the guide grooves. Both pedestal surfaces can be simultaneously processed, making the manufacturing of the plate-like apparatus more efficient. Projection of the shock absorbing member into the guide groove can be avoided if a step portion corresponding to the groove width of the guide groove is formed in the shock absorbing member before it is attached to the pedestal surface.

Such a plate-like apparatus is set in the loading object, resting on the side opposite to one side where the shock absorbing member is provided.

The integral rotating body device of the present invention comprises a shock absorbing member in the corner of an enclosure. The enclosure contains a rotating body, and in the corner, the shock absorbing member is exposed in part of the thickness direction of the enclosure. The enclosure itself is exposed in the remainder of the thickness direction of the enclosure, and the enclosure is located inward from the shock absorbing member.

More specifically, the integral rotating body device may have a structure in which a spindle for rotating the rotating body is inserted into the hole of the rotating body at a predetermined clearance.

By providing the shock absorbing member in the integral rotating body device, the rotating body can be prevented from becoming misaligned with respect to the spindle. And, by locating the enclosure inward from the shock absorbing member, the shock absorbing member lands first when the device is dropped.

To locate the enclosure inward of the shock absorbing member in the corner, a chamfer may be formed in the enclosure.

If the integral rotating body device falls and lands on its corner, the shock given to the rotating body becomes maximized when the rotating surface of the rotating body is positioned on the body's vertical line. Accordingly, if the chamfer is formed orthogonal to the line connecting the corner and the center of rotation of the rotating body, the chamfer lands in an orientation that will minimize this shock more frequently than if the chamfer were formed at another angle. This chamfer design increases the shock absorption.

Moreover, the integral rotating body device does not always fall with the rotating surface of the built-in rotating body vertically oriented. It may fall at angle to the vertical plane. A chamfer located at one side in the thickness direction of the enclosure and a shock absorbing member located on the other side in the thickness direction of the enclosure are then effective solutions to maximize shock absorption. If the integral rotating body device falls at an angle and with the one side down, the shock absorbing member on the other side lands first (unless a predetermined angle of orientation relative to the vertical axis is exceeded) because the chamfer is formed inward from the shock absorbing member on the one side. The shock can then be absorbed.

The present invention includes a magnetic data storage and retrieval system comprising a base, including a magnetic disk, and having a guide groove in the outside surface thereof It also includes a plate-like corner member set at a corner of the base and formed from a material softer than the base. In the plate-like corner member, the groove wall surface on one side (separated by the guide groove) is constructed with the base, while the groove wall surface on the other side is constructed with the corner member. The base can be characterized by further including a read/write head for reading/writing data to the magnetic disk, and an actuator for moving the read/write head.

Thus, the force and energy of a shock event can also be absorbed by the plate-like corner member formed from a material softer than the base, and the magnetic disk can be prevented from becoming misaligned.

The corner member may be formed from an elastic material.

In magnetic data storage and retrieval system of the present invention, the base has a projection projecting sideward from the built-in portion, including the magnetic disk, and the corner member can be attached and fixed to the projection by an attachment member. Further, the attachment member may have a predetermined length, and comprise a pressing portion for pressing the corner member at one end thereof, and an abutting portion abutting on the projection at the other end. Since this attachment member has a predetermined length, the pressing portion is located at a predetermined height with the abutting portion abutting on the projection of the base. The corner member can thereby be prevented from being excessively pressed by the pressing portion. This can prevent the corner member from expanding sideward, even if the corner member is formed from an elastomeric material.

Further, a second corner member maybe inserted into a second corner of the base at an insertion groove formed in the corner where the above corner member is not attached. In this case, by affixing a label covering at least part of the second corner member to the magnetic data storage and retrieval system, the second corner member can be prevented from dislodging.

BRIEF DESCRIPTION OF THE DRAWINGS

FIG. 3 is a perspective view showing a magnetic data storage and retrieval system having bumpers in its four corners, in which

FIG. 8 is a figure showing a state in which the magnetic data storage and retrieval system was dropped;

FIG. 13 is a perspective view showing the magnetic data storage and retrieval system and the adapter to which it is attached;

FIG. 15 is a perspective view showing an example of the magnetic data storage and retrieval system having bumpers, which existed prior to the present invention; and FIG. 16 is a figure showing the relation between the bumper and the guide groove, in which FIG. 16A is the case in which the groove formed in the bumper is narrower than the guide groove, and FIG. 16B is the case in which the groove formed in the bumper is wider.

DETAILED DESCRIPTION OF THE PREFERRED EMBODIMENT

The present invention is now described in detail according to the embodiments shown in the accompanying drawings.

Figure 1:
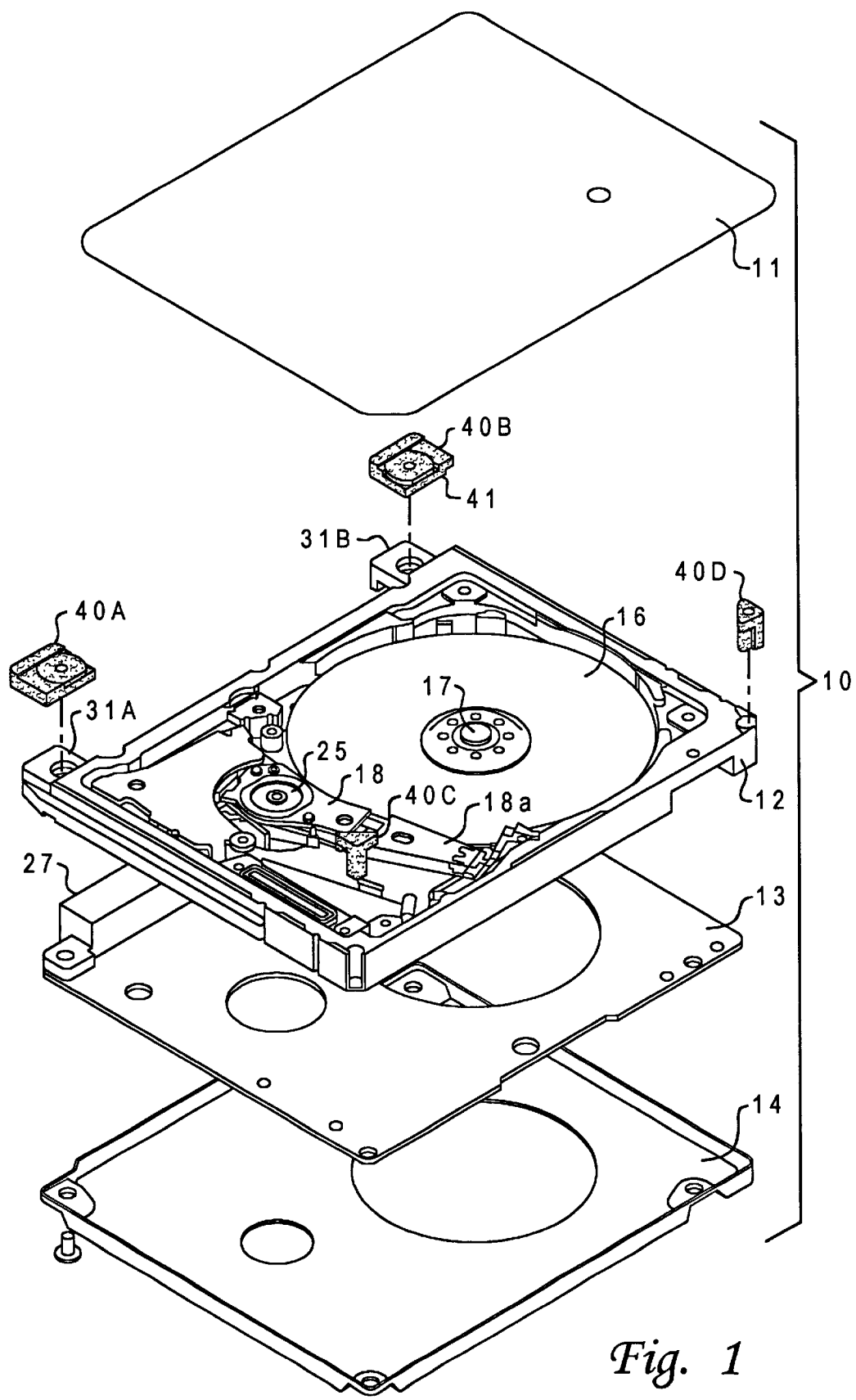
FIG. 1 is a perspective development showing a configuration of a magnetic data storage and retrieval system in this embodiment.

FIG. 1 is a figure for explaining the schematic configuration of the magnetic data storage and retrieval system in this embodiment. A magnetic data storage and retrieval system 10 is represented as a plate-like apparatus having an integral rotating body device. The magnetic data storage and retrieval system includes a top cover 11, a case 12 as the apparatus body or enclosure, a base board 13, and a bottom cover 14. In the following description, the top cover 11 side of the magnetic data storage and retrieval system 10 shown in FIG. 1 is referred to as "upper," and the bottom cover 14 side is referred to as "lower."

The base 12 forms a box, opened on the top side and having a shallow depth, and the opening on the top side is covered with the top cover 11. The base 12, accommodates a magnetic disk (rotating body) 16 for storing data, a spindle motor 17 for rotating the magnetic disk 16, an actuator 18 attached to a read/write head 18a for reading/writing data to the magnetic disk 16 at the top end thereof, and a drive source such as a voice coil motor (not shown) for driving the actuator 18.

Figure 2:
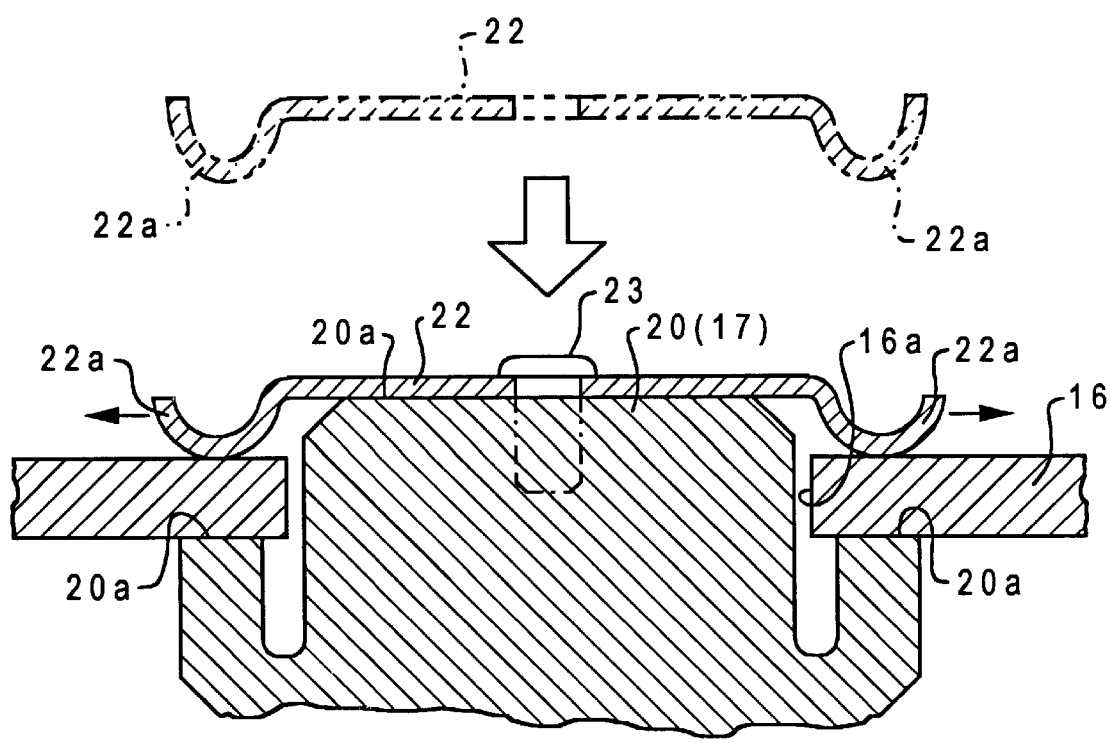
FIG. 2 is a cross-sectional view showing the articulating structure for affixing a magnetic disk.

As shown in FIG. 2, the magnetic disk 16 is fixed to the spindle 20 of the spindle motor 17 by a top clamp 22 and a screw 23. More specifically, the magnetic disk 16 has the spindle 20 inserted into its central hole 16a, and abuts the holding surface 20a of the spindle 20. On the other hand, the top clamp 22 has a flexible clamp portion 22a, shaped substantially in a J-curve in the cross-sectional view, on the outer periphery thereof. When the top clamp 22 is set on the spindle 20, and as the screw 23 is tightened, the clamp portion 22 deforms by expansion, pressing the magnetic disk 16 on the holding surface 20a. This allows the magnetic disk 16 to be pinched between the clamp portion 22a of the top clamp 22 and the holding surface 20a of the spindle 20.

As shown in FIG. 1, the actuator 18 is supported by the base 12 through a pivot 25, and freely rotates about the pivot 25. The actuator 18 is provided with a coil (not shown) for the voice coil motor on the base end portion thereof, and it is rotated by the voice coil motor (not shown).

The base board 13 is sized to cover the bottom surface of the base 12, and the magnetic data storage and retrieval system includes a circuit for propagating the power and signal that drive the spindle motor 17 and the actuator 18, and for transmitting/receiving data to/from the magnetic disk 16. Further, the base board 13 has, on one end thereof, an interface 27 for transmitting/receiving data to be read or written on the magnetic disk 16 to/from the system to which the magnetic data storage and retrieval system is attached.

Figure 3A:
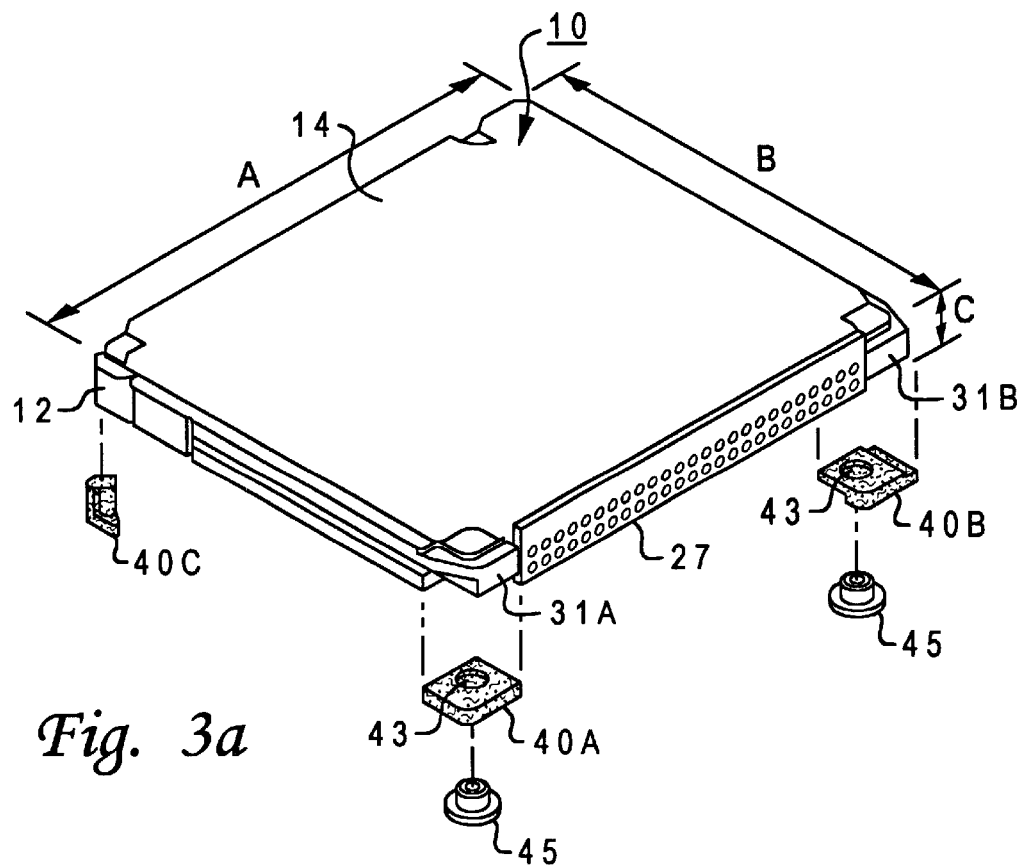
FIG. 3A is a state before the bumpers are attached.
Figure 3B:
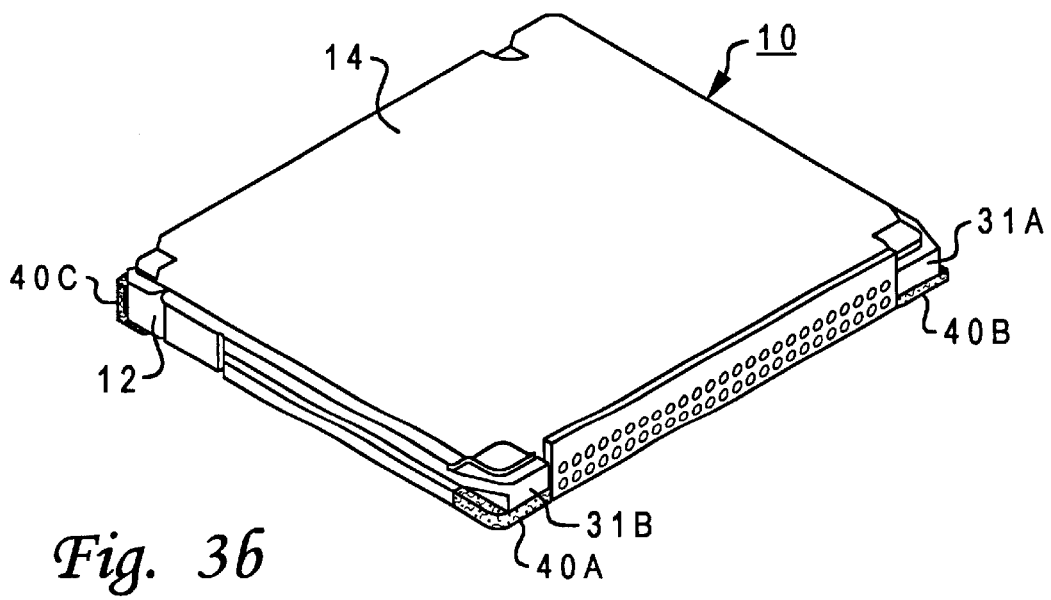
FIG. 3B is a state after the bumpers are attached.

As shown in FIG. 3, in the magnetic data storage and retrieval system 10 having the above schematic configuration, bumpers 40A, 40B, 40C, and 40D (refer to FIG. 1) are set in the four corners of the magnetic data storage and retrieval system. Details of the attachment structure are explained below.

The outer shape of the magnetic data storage and retrieval system 10 may vary but representative models may include dimensions similar to a longitudinal size A in FIG. 3 of 42.5 mm, a width size B of 36 mm, and a thickness size C of 5 mm.

Figure 4:
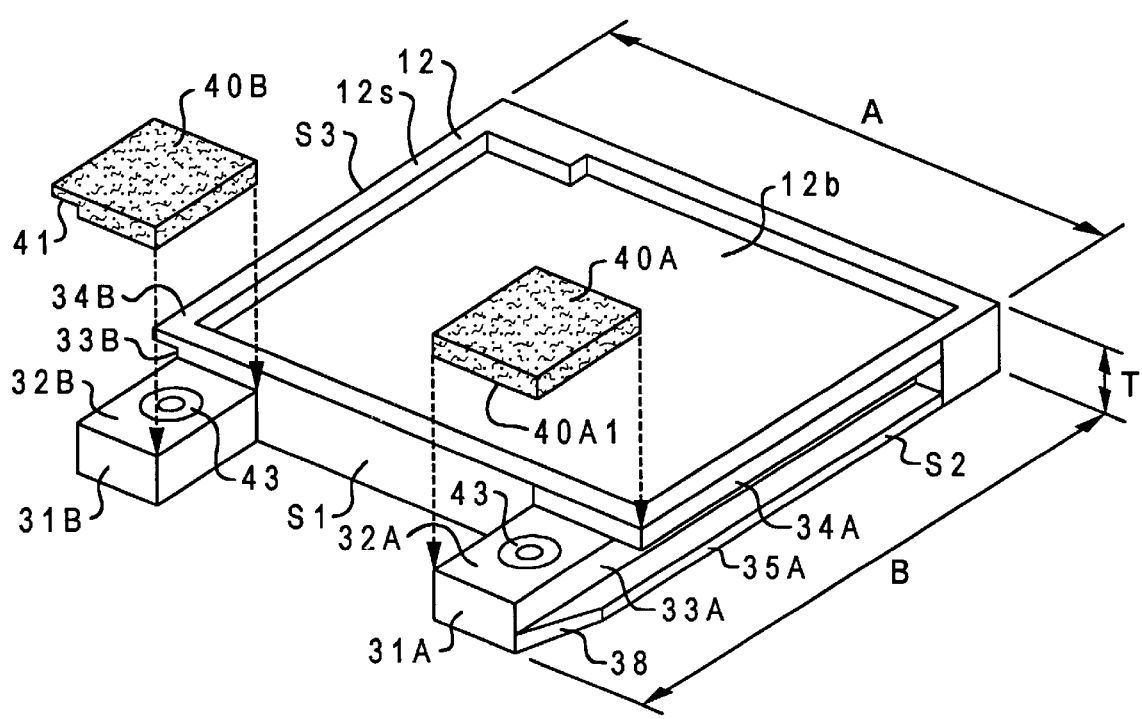
FIG. 4 is a perspective view showing the base of the magnetic data storage and retrieval system.

As shown in FIG. 4, the base 12 includes a space for receiving the magnetic disk 16 shown in FIG. 1, the spindle motor 17, and the actuator 18. The space is surrounded by the bottom portion 12b of the base 12 and a surrounding wall 12s rising up from the bottom portion 12b. The surrounding portion 12s will typically have a depth size T of 3.5 mm for instance, over the whole periphery.

On both ends of one side of the surrounding wall portion 12s, sideward projecting projections 31A and 31B are formed. The interface 27 of the base board 13 is housed between these projections 31A and 31B.

Figure 5:
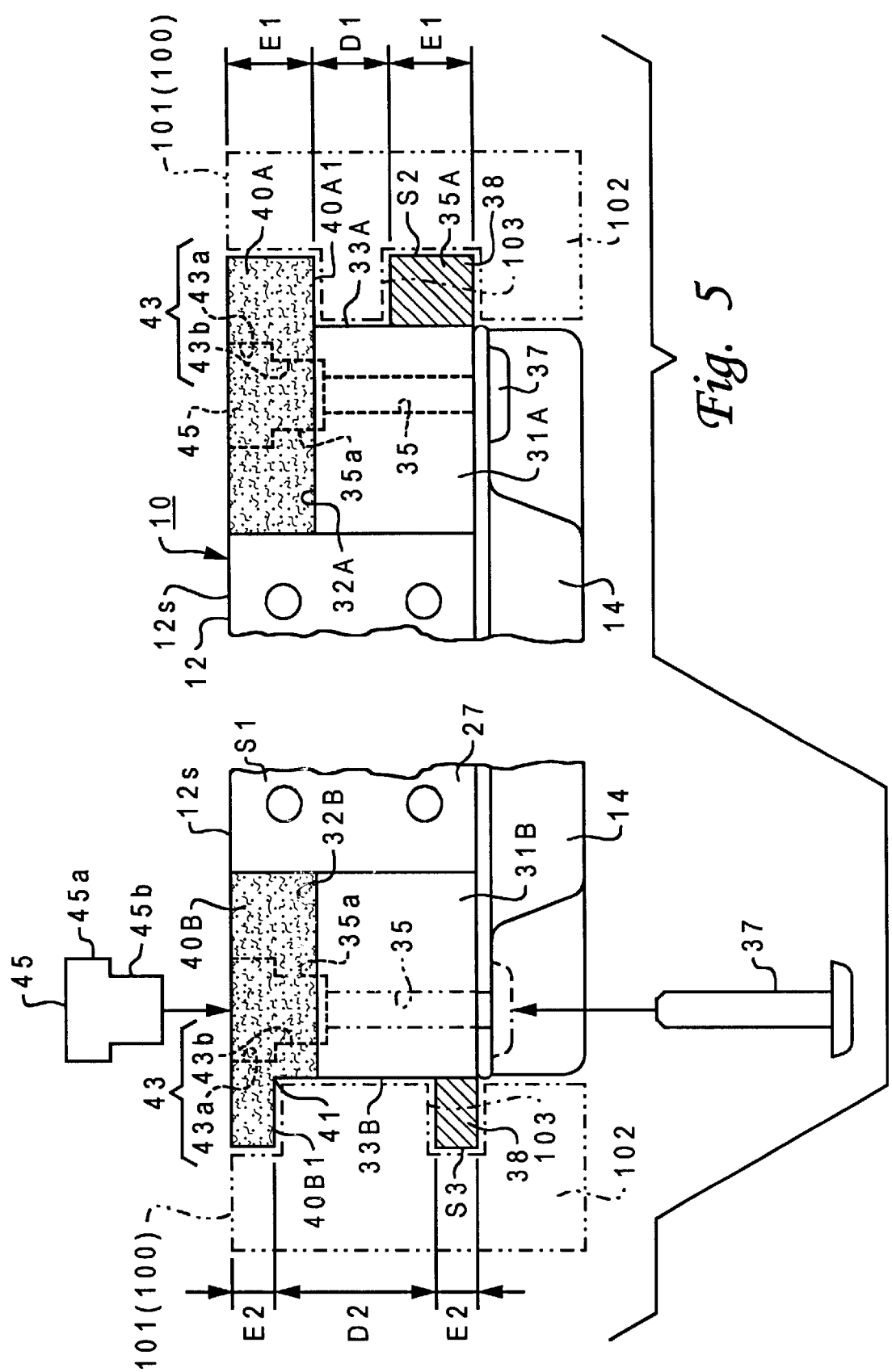
FIG. 5 is a figure showing the structure for attaching bumpers to two corners, which is a side view, in which the magnetic data storage and retrieval system is seen from the interface side.

As shown in FIGS. 4, 5, and 6, the upper sides of the projections 31A and 31B are formed into pedestal surfaces 32A and 32B, on which the bumpers 40A and 40B are mounted. The pedestal surfaces 32A and 32B are formed so as to be located below the upper surface of the surrounding wall portion 12s at a predetermined distance.

In the base 12, with respect to the side SI on which the projections 31A and 31B are located, guide grooves 33A and 33B are formed on both sides S2 and S3. The guide grooves 33A and 33B are formed to a predetermined length from the projections 31A and 31B over the projections 31A and 31B and the surrounding wall portion 12s. These guide grooves 33A and 33B constitute guides for securing the magnetic data storage and retrieval system 10 in various devices such as a digital camera or an adapter for mounting on a personal computer.

As shown in FIGS. 5 and 6, in one guide groove 33A and the other guide groove 33B, their groove widths D1 and D2 differ from each other to guarantee proper orientation at insertion. Thus, the thickness size E1 of an upper overhang 34A and a lower overhang 35A, which hang sideward above and below the guide groove 33A, and the thickness size E2 of an upper overhang 34B and a lower overhang 35B, which hang sideward over above and below the guide groove 33B, are also different.

Figure 6A:
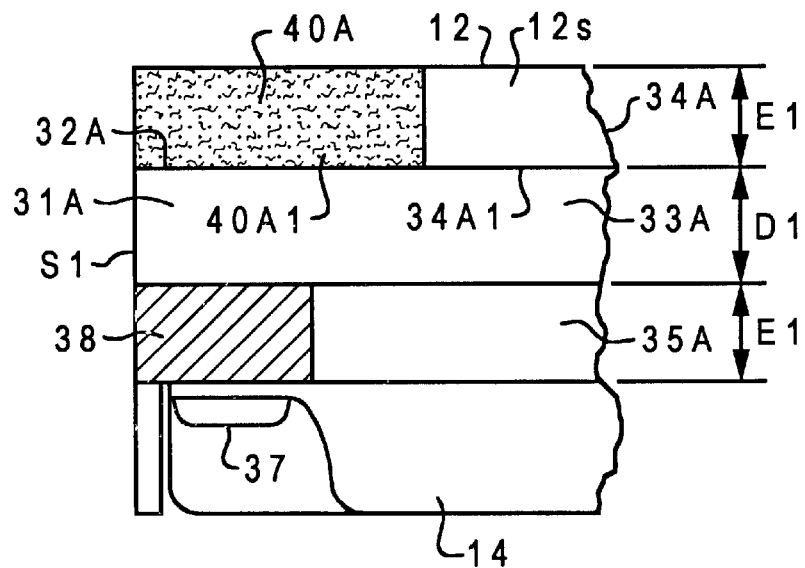
FIG. 6A is a right side view of FIG. 5.
Figure 6B:
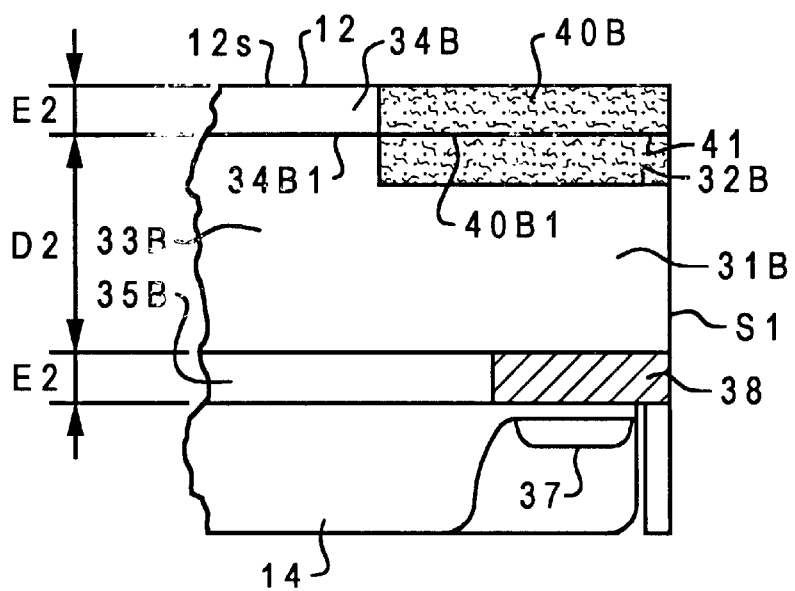
FIG. 6B is a left side view of FIG. 5.

As shown in FIG. 6A, one pedestal surface 32A is set at the same level as lower surface 34A1 of the upper overhang 34A or slightly there above. As shown in FIG. 6B, the other pedestal surface 32B is formed at the same level with the pedestal surface 32A for production efficiency, so the pedestal surface 32B is located below the underside 34B1 of the upper overhang 34B, which is different in thickness from the upper overhang 34A (refer to FIGS. 5 and 6A).

The bumpers 40A and 40B, which are set on the pedestal surfaces 32A and 32B as shock absorbing members or corner members, are made of an elastic material that is softer than the base 12 and are substantially rectangular in shape. Typical embodiments will employ an elastomeric material such as polyurethane rubber.

As shown in FIGS. 5 and 6A, the thickness of the bumper 40A is set to be substantially the same as the thickness size E1 of the upper overhang 34A, or the step size between the upper surface of the surrounding wall portion 12s and the pedestal surface 32A, or slightly smaller than the thickness size E1 of the upper overhang 34A, or the step size between the upper surface of the surrounding wall portion 12s and the pedestal surface 32A. If the bumper 40A is set on the pedestal surface 32A, the portion hanging sideward over from the pedestal surface 32A continues to the upper overhang 34A, and its underside 40A1 continues to the underside 34A1 of the upper overhang 34A, or it is located slightly there above.

As to the bumper 40B, shown in FIGS. 5 and 6B, the thickness size E2 of the upper overhang 34B is different from the thickness size E1 of the upper overhang 34A. If the whole of the bumper 40B has substantially the same thickness as the step size between the surrounding wall portion 12s and the pedestal surface 32B, the portion projecting sideward from the pedestal surface 32B projects downward from the underside of the upper overhang 34B, and it projects into the guide groove 33B. A step 41 of a predetermined size (=thickness size E1–E2) is formed on the underside of the bumper 40B, and the thickness of the portion hanging sideward over from the pedestal surface 32B is set to be substantially the same as the thickness size E2 of the upper overhang 34B or slightly smaller than the thickness size E2 of the upper overhang 34B. This allows the underside 40B1 of the bumper 40B to continue to the underside 34B1 of the upper overhang 34B, or to be located slightly above the underside 34B1 of the upper overhang 34B.

Bumpers 40A and 40B feature a through hole 43 passing vertically through them. A step is formed in the intermediate portion of the through hole 43 so that the upper side 43a is larger in diameter than the underside 43b.

To set the bumpers 40A and 40B on the pedestal surfaces 32A and 32B, a collar (attachment member) 45 made of a material such as metal or resin harder than the bumpers 40A and 40B is used. The collar 45 has a height larger than the thickness of the bumpers 40A and 40B by a predetermined size, and a large diameter portion (pressing portion) 45a and a small diameter portion 45b smaller than the large diameter portion 45a are formed continuously, and a screw hole (not shown) is formed in the underside of it.

The pedestal surfaces 32A and 32B each contain a hole 35, passing vertically through. The hole allows a screw 37, described later, to be threaded into it, and the upper portion of the through hole 35 is made into a countersunk hole 35a, having an internal diameter corresponding to the small diameter portion 45b of the collar 45.

To fix such bumpers 40A and 40B, the collar 45 is inserted into the through hole 43 of the bumpers 40A and 40B. The large diameter portion 45a is received in the large diameter portion 43a of the through hole 43 and does not project upward beyond the edge of the through hole 43, while the small diameter portion 45b projects downward from the bumpers 40A and 40B. The downward-projecting, small diameter portion 45b is inserted into the countersunk hole 35a of the base 12 to abut the lower end surface (abutting surface) upon the bottom surface of the countersunk hole 35a. And, from the underside of the base 12, the screw 37 is inserted into the through hole 35 and screwed into the screw hole (not shown) of the collar 45, thereby allowing the large diameter portion 45a to function as the pressing portion. The bumpers 40A and 40B are pinched between the collar 45 and the pedestal surfaces 32A and 32B and fixed. Displacement of the bumpers 40A and 40B can be prevented because the lower end portion (small diameter portion 45b) of the collar 45 is positioned by the countersunk hole 35a of the pedestal surfaces 32A and 32B. The width of the magnetic data storage and retrieval system 10 can be prevented from becoming larger than a predetermined size, because the bumpers 40A and 40B can be protected from sideward expansion due to excessive crushing. The amount of pressure applied to the bumpers 40A and 40B is constrained by the limits placed on the vertical position of the collar 45 by the bottom surface of the countersunk hole 35a.

In the area where the bumpers 40A and 40B are provided, the upper surface forming one side wall of the guide groove 33A (the groove wall surface on one side separated by the guide grooves 33A and 33B) is formed by the underside 40A1 of the bumpers 40A and 40B and is made of an elastomeric material. The lower surface forming the other side wall (the groove wall surface on one side separated by the guide grooves 33A and 33B) is formed by the upper surface of the lower overhangs 35a and 35B and is made of hard resin or metal.

In the area where the bumpers 40A and 40B are provided, the bumpers 40a and 40B project beyond the base 12 on one side in the thickness direction of the magnetic data storage and retrieval system 10. In the area where the bumpers 40A and 40B are provided, part of the guide groove is formed by the bumpers 40A and 40B in the thickness direction of the base 12 and the remaining portion is formed by the base 12. In the corner where the bumpers 40A and 40B are provided, the bumpers 40A and 40B are exposed in the thickness direction of the base 12 and the base 12 is exposed in the remaining portion.

Figure 7A:
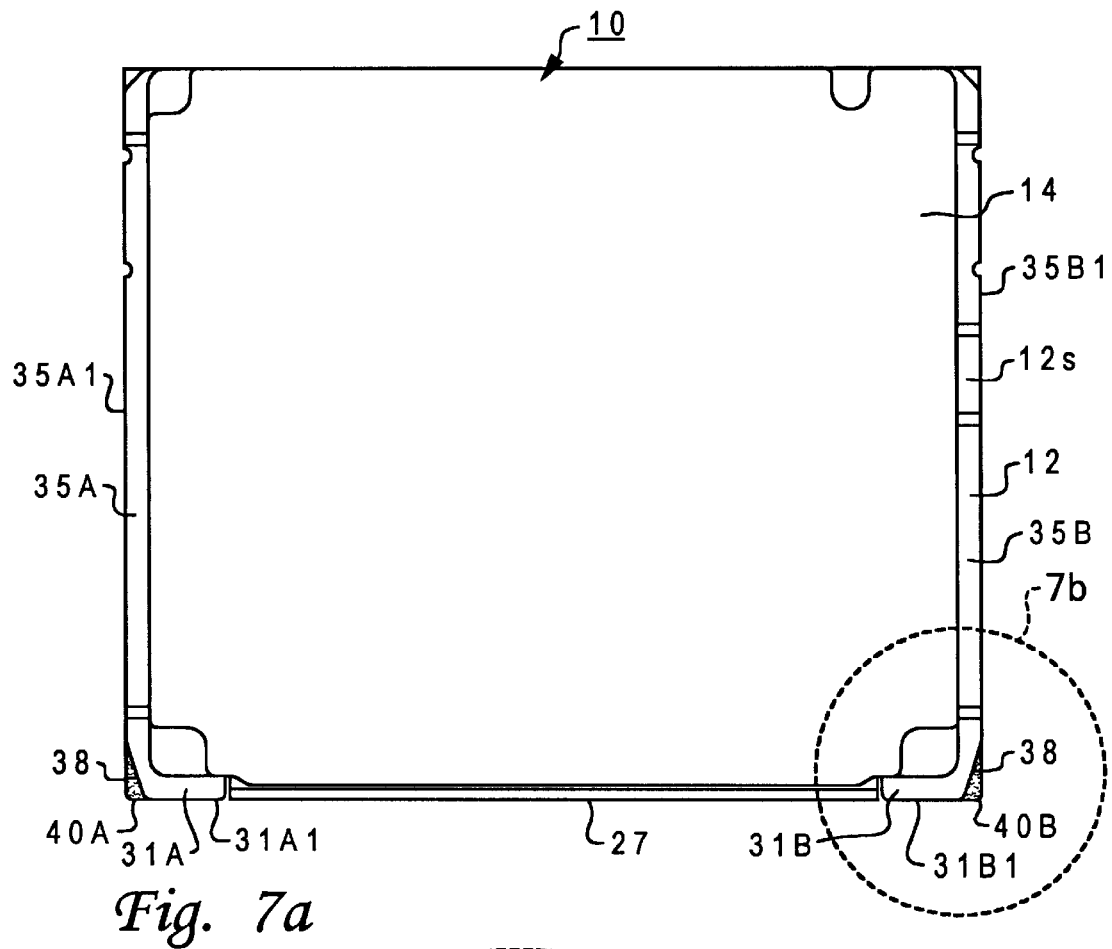
FIG. 7A is a bottom view of the magnetic data storage and retrieval system.

As shown in FIGS. 4 and 7, the lower overhangs 35A and 35B are chamfered at a predetermined angle in the end portions of the projections 31A and 31B to form a chamfer 38. The chamfer 38 is formed in the lower overhangs 35A and 35B, thereby allowing the bumpers 40A and 40B to project beyond the base 12. In the portion where the bumpers 40A and 40B are provided, the bumpers 40a and 40B are provided on one side in the thickness direction of the base 12, and the chamfer 38 is provided on the other side.

Figure 8A:
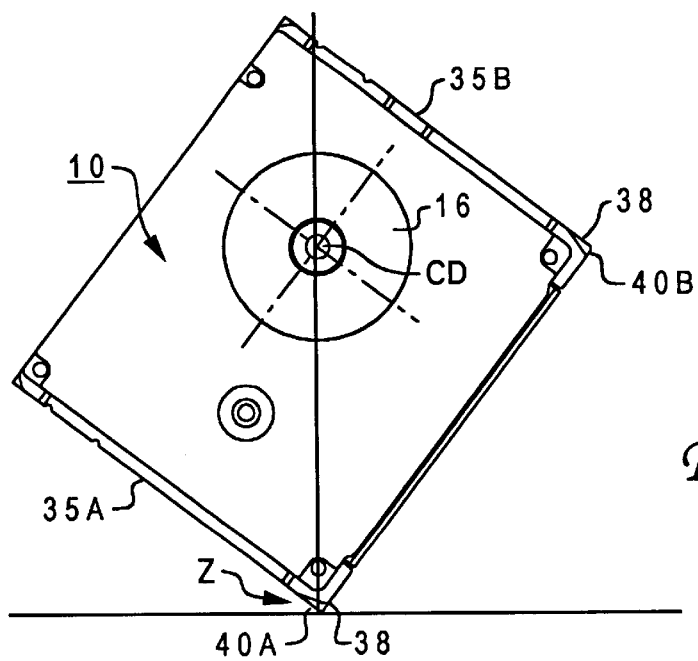
FIG. 8A is a figure showing a state in which the center of rotation of the magnetic disk is positioned vertically above the landing point.

The chamfer angle of the chamfer 38 is set so that the chamfer 38 only partially lands, even if the bumpers 40B and 40B are crushed by the shock of their landing. In particular, because there is an object to prevent the magnetic disk 16 from becoming misaligned, the angle of the chamfer 38 is set on the basis of the position of the center of rotation CD of the magnetic disk 16. More specifically, as shown in FIG. 8A, it is assumed that the magnetic data storage and retrieval system 10 falls and first lands at the bumper 40A. The angle of the chamfer 38 is set so that, when the center of rotation of the magnetic disk 16 is positioned at a landing point Z, namely, on the vertical line of the bumper 40A, the chamfer 38 is substantially orthogonal to the vertical line; it is substantially parallel with the landing plane.

In addition to this, the optimum angle of the chamfer 38 is set in consideration of the following points.

(a) Since the lower overhangs 35A and 35B exist primarily in the width direction when the magnetic data storage and retrieval system 10 is attached to another device or an adapter, it is desired that the areas of the sides 35A1 and 35B1 of the lower overhangs 35A and 35B are maximized.

(b) A typical design will attempt to maximize the area of the front portions 31A1 and 31B1 (refer to FIG. 7) of the projections 31A and 31B because, if the magnetic data storage and retrieval system 10 is inserted into a device such as a digital camera, the mechanism for removing the magnetic data storage and retrieval system often presses the front portions 31A1 and 31B1 (refer to FIG. 7) of the projections 31A and 31B.

Figure 7B:
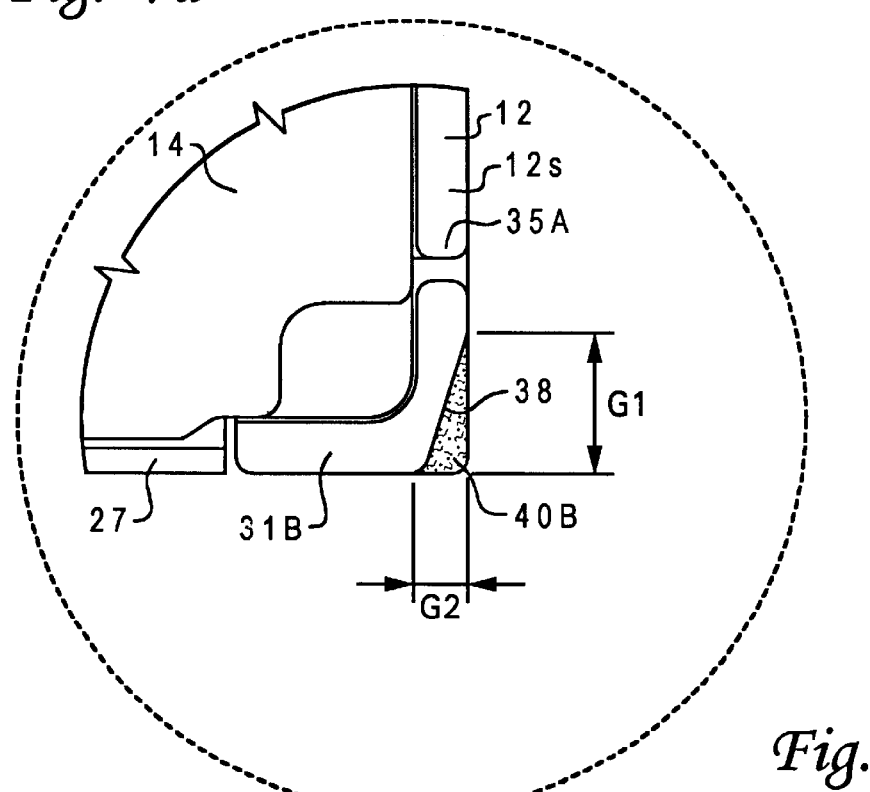
FIG. 7B is an enlarged view of the encircled area in FIG. 7A.

The chamfer 38 size G1 in FIG. 7B will typically be 3 mm, and the size G2 will typically be 1 mm in the embodiment herein proposed.

Attachment structures for the bumpers 40C and 40D, which are set as other shock absorbing members or other corner members in the remaining two corners of the base 12, as shown in FIG. 1, are now described.

Figure 9A:
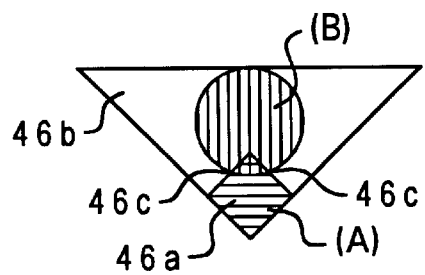
FIG. 9A is a bottom view of the bumpers to be attached to the remaining two corners of the disk.
Figure 9B:
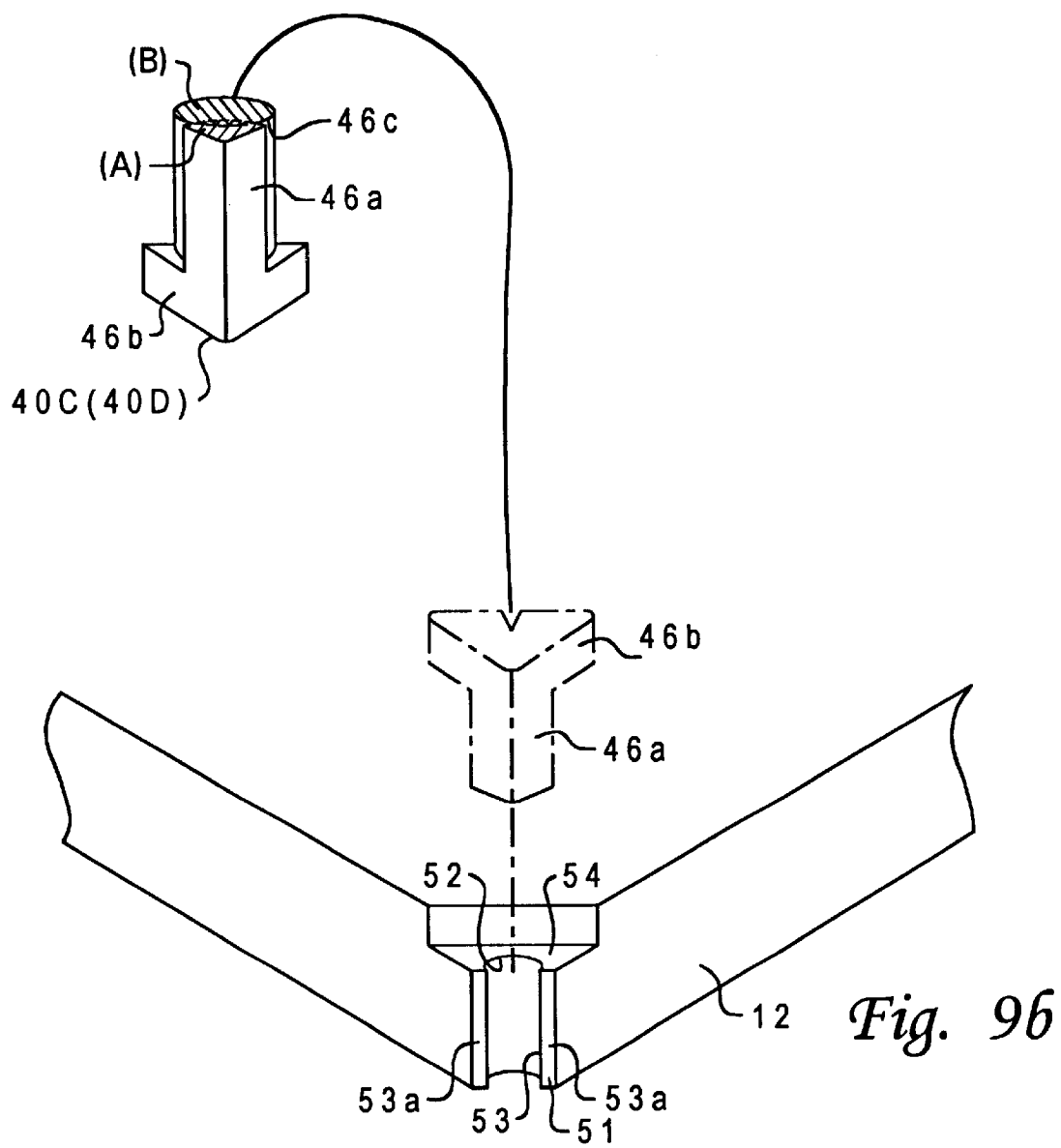
FIG. 9B is a figure showing the structure for attaching the bumpers.

The bumpers 40C and 40D are formed from an elastomeric material such as polyurethane rubber, as is the case with the bumpers 40A and 40B. As shown in FIG. 9, the bumpers 40C and 40D are given a common shape, and made up of an insertion portion 46a and a stopper portion 46b. As shown in FIG. 9A, the cross-sectional shape of the insertion portion 46a is shaped such that the substantially square portion and the substantially circular portion partially overlap each other, forming a vertically contiguous engagement groove 46c between the two. As shown in FIG. 9B, the stopper 46b is a triangular plate having a predetermined thickness and a cross-sectional area larger than that of the insertion portion 46a.

In the two corners of the base 12 (in FIG. 9, only one corner is shown), a chamfer 51 is formed. In the base 12, an insertion hole (insertion groove) 52, shaped substantially in a circle in the cross-sectional view, is formed. The portion of the insertion portion 46a shaped substantially in a circle [area of sloped lines (B)] is inserted into the insertion hole (insertion groove) 52. The insertion hole 52 is shaped so that part of it faces the chamfer 51. In the chamfer 51, there is a vertically continuous slit 53 for allowing the passage of the portion [area of sloped lines (A)] shaped substantially in a square in the cross-sectional view of the insertion portion 46a. Above the insertion hole 52, there is formed a pedestal portion 54, located below the upper surface of the base 12 by a predetermined size.

The bumpers 40C and 40D are set in the base 12 by inserting the insertion portion 46a into the insertion hole 52. At this point, the holding portions 53a and 53a located on both sides of the slit 53 engage with the engaging groove 46c of the insertion portion 46a to hold the bumpers 40C and 40D and prevent them from falling sideward. The stopper portion 46b abuts on the pedestal portion 54 to limit the downward movement of the bumpers 40C and 40D.

The bumpers 40C and 40D are set in the base 12 in this way, and the corners of the base 12 are wholly covered with the bumpers 40C and 40D made of an elastomeric material.

Figure 10:
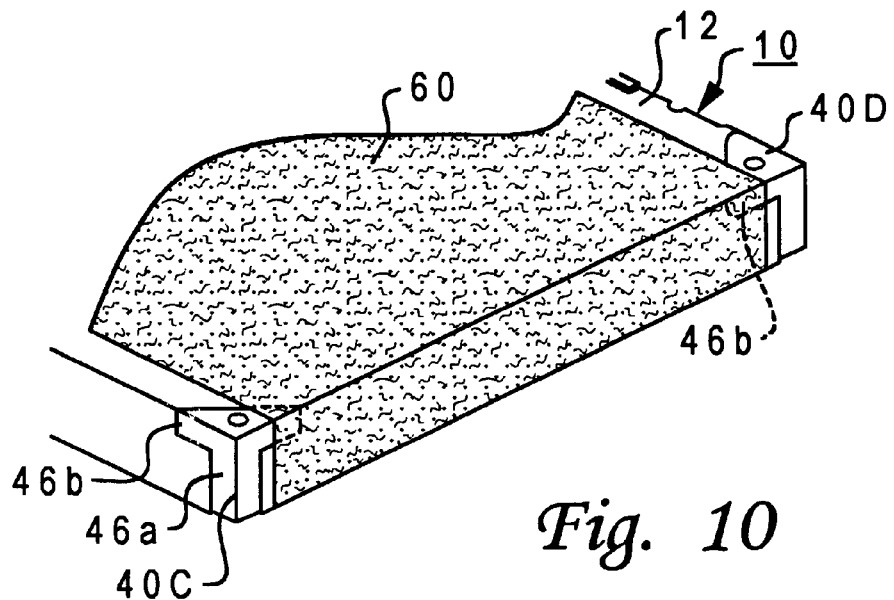
FIG. 10 is a perspective view showing the label stuck to the magnetic data storage and retrieval system.

This leaves the remaining problem that the bumpers 40C and 40D can be drawn upward and out. FIG. 10 shows a continuous label 60 that is affixed over the upper surface, side, and underside of the magnetic data storage and retrieval system 10. This label 60 covers at least part of the stopper portion 46b of the bumpers 40C and 40D to prevent the bumpers 40C and 40D from falling out.

Thus, if the magnetic data storage and retrieval system 10 comprising the bumpers 40A, 40B, 40C and 40D in its four corners is dropped, the shock will be softened because the bumpers 40A, 40B, 40C and 40D land first.

Figure 11:
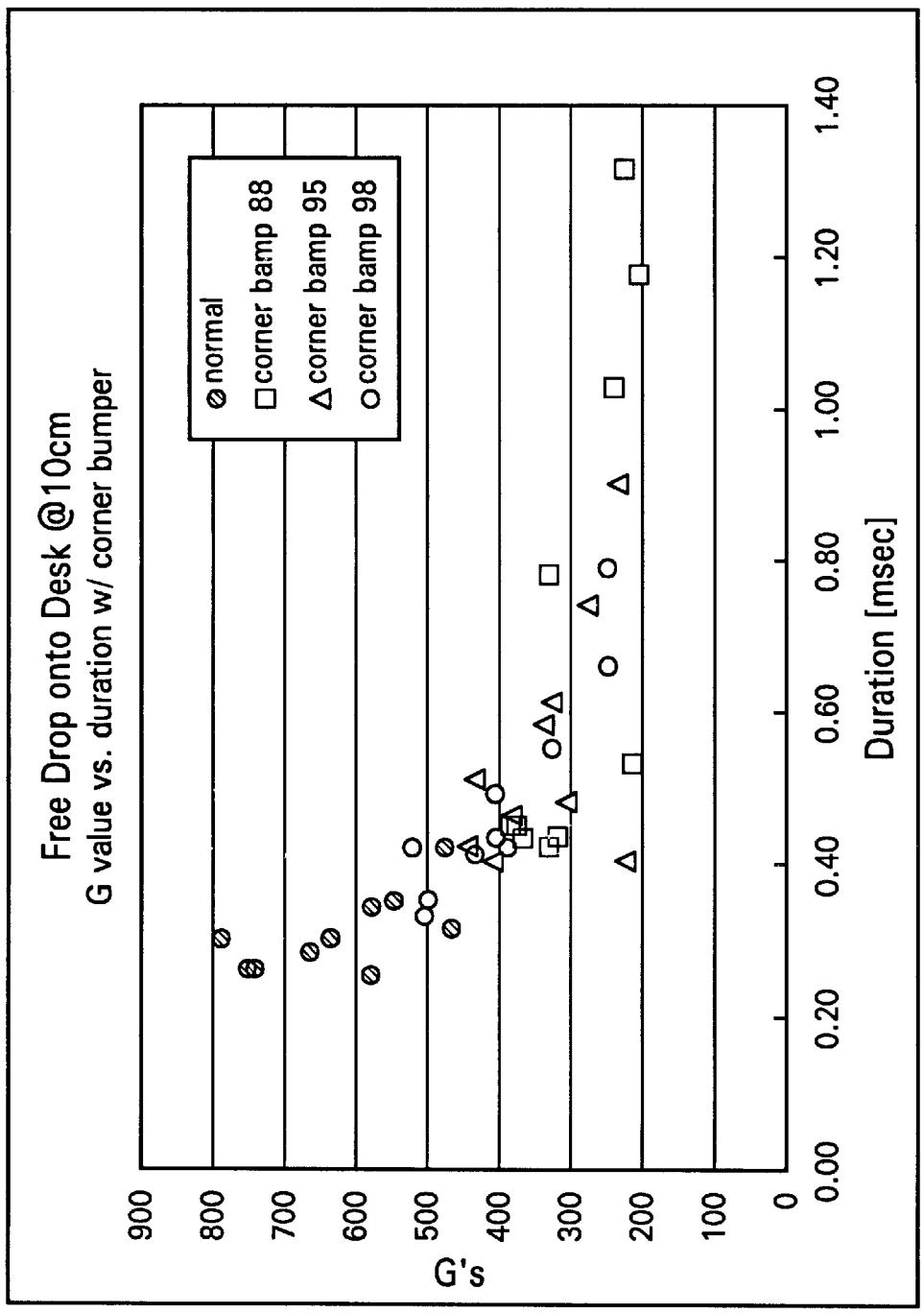
FIG. 11 is a figure showing the acceleration, which acted when the magnetic data storage and retrieval system was dropped at a given angle, vs. the duration of the acceleration.

Shown in FIG. 11 is the relation between the acceleration of gravity (G), which acted when the magnetic data storage and retrieval system 10 having the bumpers 40A, 40B, 40C, and 40D was dropped at random from the height of 10 cm, and the duration of acceleration. The bumpers (corner bumpers) 40A, 40B, 40C, and 40D were tested for three kinds of rubber hardness (the value is the scale of the rubber hardness in the JIS standard).

For comparison, a similar test was carried out also for a magnetic data storage and retrieval system which does not have the bumpers 40A, 40B, 40C, and 40D (designated as "normal"). These figures show that, by providing the bumpers 40A, 40B, 40C, and 40D, the applied acceleration becomes smaller, the duration of acceleration becomes longer as the rubber hardness is reduced, and the acceleration per unit time becomes smaller.

Figure 12:
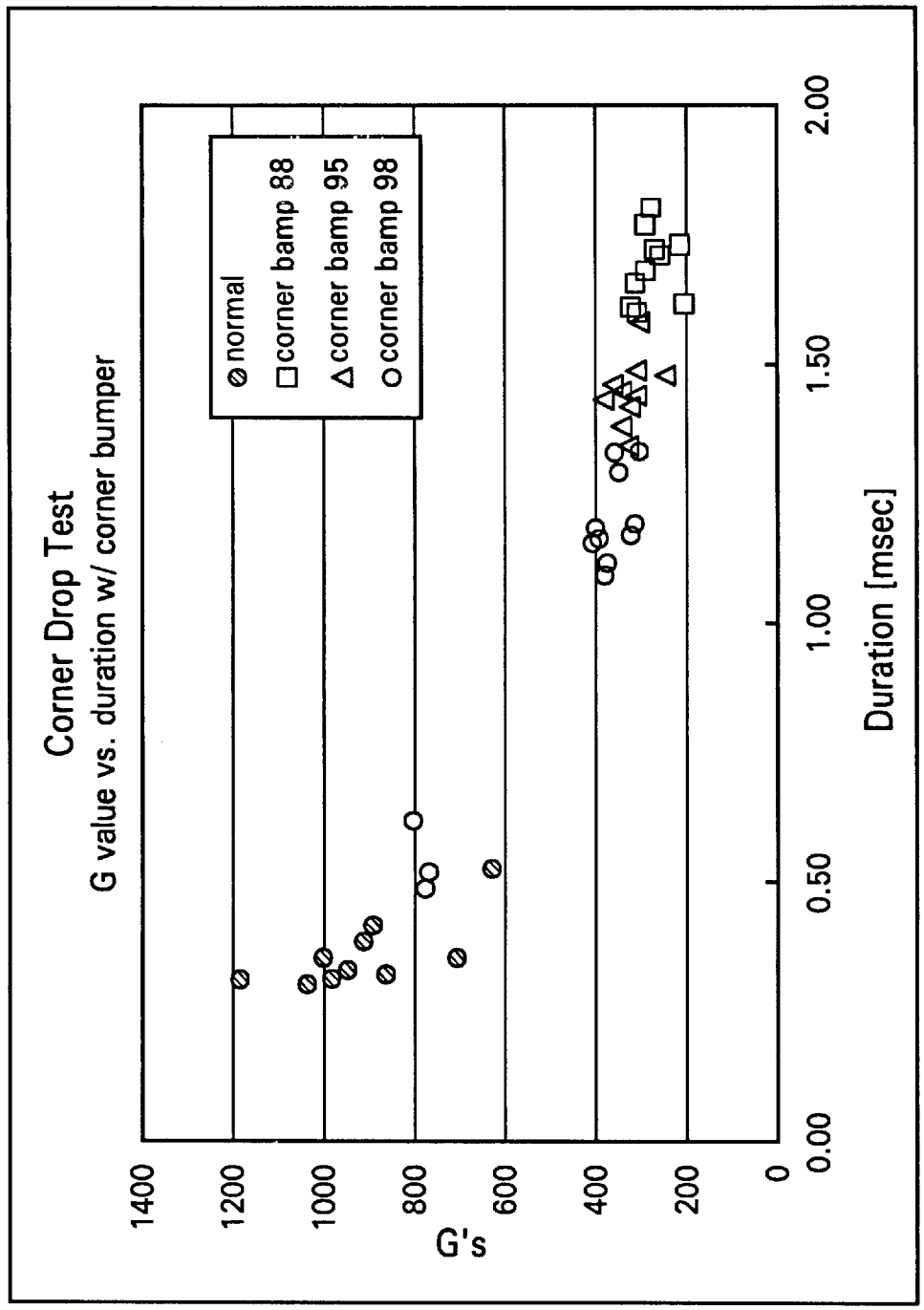
FIG. 12 is a figure showing the acceleration, which acted when the magnetic data storage and retrieval system was dropped at a corner, vs. the duration of the acceleration.

FIG. 12 shows a result when a test similar to FIG. 11 was performed so that the corners of the magnetic data storage and retrieval system 10, or the bumpers 40A, 40B, 40C, and 40D land first. As seen from this figure, a tendency is shown more clearly, in which the bumpers 40A, 40B, 40C, and 40D reduce applied acceleration, increase the duration of acceleration as the rubber hardness is reduced, and reduce the acceleration per unit.

Figure 8B:
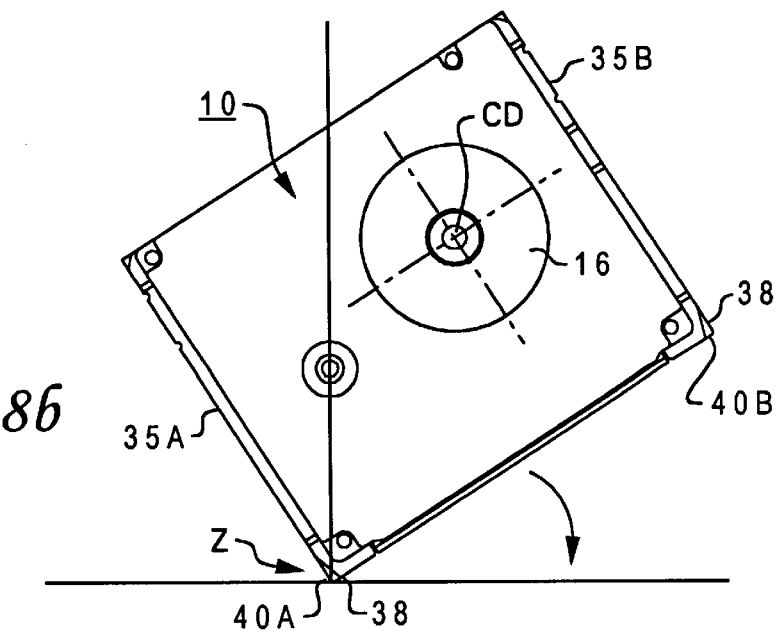
FIG. 8B is a figure showing a state in which the center of rotation of the magnetic disk deviates vertically above the landing point.

The largest acceleration is applied to the magnetic disk 16 fixed to the spindle 20 by the top clamp 22 when the magnetic data storage and retrieval system 10 is dropped on any of the corners of the magnetic data storage and retrieval system 10 with the center of rotation CD of the magnetic disk 16 being positioned on the vertical line of the landing point Z, as shown in FIG. 5A. As shown in FIG. 8B, if the center of rotation CD of the magnetic disk 16 deviates from the vertical line of the landing point Z, then, as shown by an arrow in the figure, the acceleration escapes in the direction in which the magnetic data storage and retrieval system 10 rotates, and the acceleration acting on the magnetic disk 16 is smaller than that seen in the case of FIG. 8A.

Even for the case shown in FIG. 8A, because the chamfer 38 causes the bumper 40A to land first, the force of impact can be effectively reduced. In addition, the chamfer angle of the chamfer 38 is set in consideration of the position of the center of rotation CD of the magnetic disk 16. The chamfer 38 only partially lands, even if the bumper 40A is crushed by the shock of the landing, and the shock can be positively reduced by the bumper 40A.

Figure 8C:
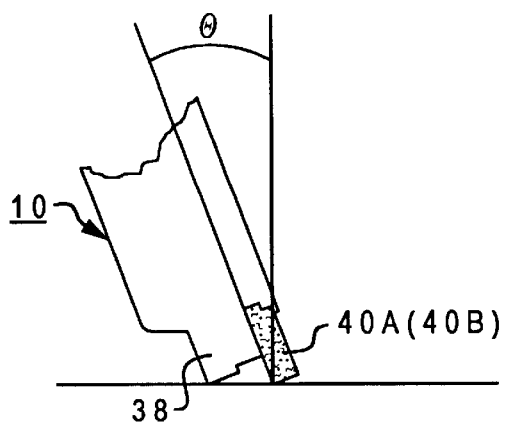
FIG. 8C is a figure showing a state in which the disk was dropped at an angle.

FIG. 8C shows that the plane on which the plate-like magnetic data storage and retrieval system 10 is located (rotating plane of the magnetic disk 16) is at an angle of θ with respect to the vertical plane, in impact scenarios similar to those in FIG. 8A or FIG. 8B. Also, because the bumper 40A lands before the chamfer 38 until the angle θ reaches a maximum of about 20 degrees, the shock of the landing can also be effectively reduced. If the inclination of the magnetic data storage and retrieval system 10 becomes larger than 20 degrees, the acceleration component decreases in the direction that tends to displace the magnetic disk 16.

Further, FIG. 8 shows only the case in which the bumper 40A lands first, but the case where the bumper 40B lands first behaves in a similar manner.

If the bumper 40C or 40D lands first, the shock can always be effectively absorbed regardless of its landing angle, because the bumpers 40C and 40D are provided so as to cover the whole corners of the magnetic data storage and retrieval system 10.

The magnetic data storage and retrieval system 10 is sometimes attached to a device such as a digital camera, or a loading object such as an adapter for articulation to a personal computer. To attach the magnetic data storage and retrieval system 10 to an adapter 100 as the loading object (as shown in FIG. 13) requires, in a pair of guide arms (guide portions) 101 formed on the adapter 100, a guide portion 102 to provide guidance relative to the lower overhangs 35A and 35B on the underside (in FIG. 13, the upper side) of the magnetic data storage and retrieval system 10, and a projection 103 fitting into the guide grooves 33A and 33B of the magnetic data storage and retrieval system 10.

In the magnetic data storage and retrieval system 10 shown in FIG. 5, at the top end of the guide grooves 33A and 33B, or at the portion where the bumpers 40A and 40B are provided, one of the side walls of the guide grooves 33A and 33B is formed from the elastomeric material of the bumpers 40A and 40B, but the other side wall is formed from a material such as metal or resin forming the base 12. If compared with the case shown in FIG. 16, the friction produced between the guide grooves 33A and 33B is small and the magnetic data storage and retrieval system 10 can be easily inserted and removed. Moreover, since the bumpers 40A and 40B are set on the pedestal surfaces 32A and 32B and their thickness is made substantially the same as the upper overhangs 34A and 34B or slightly smaller, the extension into the guide grooves 33A and 33B of the bumpers 40A and 40B can be prevented. The insertion and removal of the magnetic data storage and retrieval system 10 can be easily be carried out.

As described above, in accordance with the above described magnetic data storage and retrieval system 10, external shock can be absorbed by the bumpers 40A, 40B, 40C, and 40D mounted on the four corners to prevent the magnetic disk 16 from being displaced. This prevents the deterioration of function as a magnetic data storage and retrieval system. It can also be easily and firmly attached to the adapter 100.

In the above embodiment, for the chamfer sizes of the chamfer 38, the size G1 was 3 mm and the size G2 was 1 mm, but this is not restrictive. The chamfer sizes may be appropriately set in view of the shock absorbing properties required in the magnetic data storage and retrieval system 10, according to the articulating structure of the magnetic disk 16, and the material of the bumpers 40A, 40B, 40C and 40D.

Further, in the above embodiment, the pedestal surfaces 32A and 32B were set at the same level to facilitate the processing, but the heights of the pedestal surfaces may be caused to match the guide grooves 33A and 33B, respectively. In this case, the bumper 40B can be shaped in a simple plate, and the step 41 can be omitted.

Figure 14:
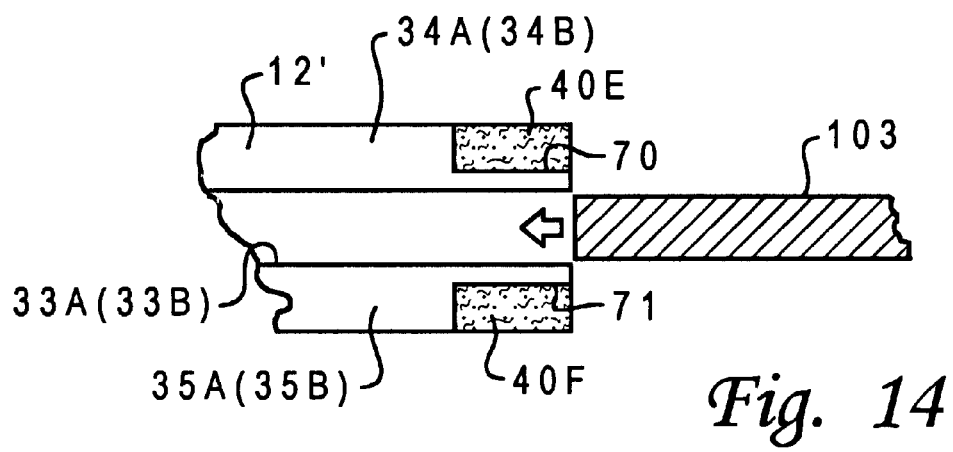
FIG. 14 is a perspective view showing another example of the bumper.

As shown in FIG. 14, it is also possible that pedestal surfaces 70 and 71 are formed on the upper and lower surfaces of a base (apparatus body, enclosure) 12', and bumpers (shock absorbing members, corner members) 40E and 40F are attached to the pedestal surfaces 70 and 71. With this arrangement, the whole length of the guide grooves 33A and 33B is formed on the base 12'. The whole length of the guide grooves 33A and 33B is formed from the metal or resin material forming the base 12', so that the magnetic data storage and retrieval system is smoothly inserted and removed. Because the bumpers 40E and 40F can be provided at the same thickness regardless of the groove width of the guide grooves 33A and 33B, the processing of the base 12' and the manufacturing efficiency the process that produces the bumpers 40E and 40F can be improved.

Moreover, the attachment structure of the bumpers 40A, 40B, 40C, and 40D can be effectively applied to a variety of devices, not merely to those made to comply with the Compact Flash standard. Such devices include a card-type hard magnetic data storage and retrieval system complying with the PCMCIA (Personal Computer Memory Card International Association) standard. Of course, if a guide groove or rotating body is provided, the present invention can be effectively applied to an apparatus including moving portions, various plate-like devices, and integral rotating body devices, without being limited to a magnetic data storage and retrieval system.

As described above, in accordance with the present invention, the external shock can be effectively absorbed, damage to required functionality can be prevented, and the attachment to other devices can be easily and positively performed.

What is claimed is:

1. A plate-like storage apparatus, attachable to and detachable from an electronic system having a first guide portion and a second guide portion, comprising:

an apparatus body shaped substantially in a rectangle;

a first guide groove and a second guide groove formed in a first side and a second side of said apparatus body so as to correspond to said first guide portion and said second guide portion, with at least one end of each of said first guide groove and said second guide groove extending to a first corner and a second corner of said apparatus body;

a first shock absorbing member and a second shock absorbing member provided in a thickness direction on said first side and said second side of said apparatus body at said first corner and said second corner, in which said first guide groove and said second guide groove are formed, and projecting beyond said apparatus body; wherein said first guide groove and said second guide groove formed in said first side and said second side of said plate-like storage apparatus are different from one another in a groove width;

in said apparatus body, on said first side and said second side, a first pedestal surface and a second pedestal surface, on which said first shock absorbing member and said second shock absorbing member are mounted, are respectively formed to match said first guide groove or said second guide groove; and in said second shock absorbing member attached to said second pedestal surface on said second guide groove side, a step corresponding to the groove width of said second guide groove is formed.

2. A data storage and retrieval system, comprising:

a base having a longitudinal dimension, a width dimension, a thickness dimension, and side walls extending in a width direction, the base being formed from a first material;

a pair of guide grooves located on opposite sides of an exterior of to base and extending in the width direction, each of the guide grooves being defined by one of the side walls and first and second overhangs that extend in a longitudinal direction; and at least a portion of each of the first overhangs is formed from a second material that is softer than the first material of the base such tat the second material is a shock absorber, and the second overhang are formed entirely from the first material of the base.

3. The data storage and retrieval system of claim 2, wherein the second material of said at least a portion of each of the first overhangs is elastic.

4. The data storage and retrieval system of claim 2, wherein a chamfer is formed in each of the second overhangs such that the second overhangs have a longitudinal dimension that is less than a longitudinal dimension of said at least a portion of each of the first overhangs.

5. The data storage and retrieval system of claim 2, wherein one of said at least a portion of each of the first overhangs has a step formed therein such that a thickness dimension between said one of said at least a portion of each of the first overhangs and a respective one of the second overhangs is greater than a thickness dimension between the other one of said at least a portion of each of the first overhangs and the other one of the second overhangs.

6. The data storage and retrieval system of claim 2, further comprising a pair of bumpers mounted to the base opposite respective ones of said at least a portion of each of the first overhangs, the bumpers being formed from the second material and having a geometry that mechanically interlocks with the base to retain the bumpers on the base and restrain the bumpers from movement in the longitudinal direction, the width direction, and at least part of a thickness direction.

7. The data storage and retrieval system of claim 6, wherein each of the bumpers has a segment that aligns with and is coplanar with a surface of the base; and further comprising:

a label affixed to the base such that the segments of the bumpers are overlapped by the label and restrained from movement in a thickness direction other than said at least part of a thickness direction.

8. A data storage and retrieval system, comprising:

a base having a generally rectangular shape that defines four corners, a longitudinal dimension, a width dimension, a thickness dimension, and side walls extending in a width direction;

means for storing data located in the base;

a pair of guide grooves located on opposite sides of an exterior of the base and extending in the width direction, each of the guide grooves being defined by one of the side walls and first and second overhangs that extend away from the base in a longitudinal direction; and a step formed in one of the first overhangs such that a thickness dimension between said one of the first overhangs and an adjacent one of the second overhangs is greater than a thickness dimension between the other one of the first overhangs and the other one of the second overhangs.

9. The data storage and retrieval system of claim 8, wherein a chamfer is formed in each of the second overhangs such that the second overhangs have a longitudinal dimension that is less than a longitudinal dimension of the first overhangs.

10. The data storage and retrieval system of claim 9, further comprising a bumper mounted to the base on each of two of the corners, opposite the chamfers in the second overhangs, to define two bumpers, each of the bumpers having a geometry that mechanically interlocks with the base to retain the bumpers on the base and restrain the bumpers from movement in the longitudinal direction, the width direction, and at least part of a thickness direction.

11. The data storage and retrieval system of claim 10, wherein each of the bumpers has a segment that aligns with and is coplanar with a surface of the base; and further comprising:

a label affixed to the base such that the segments of the bumpers are overlapped by the label and restrained from movement in a thickness direction other than said at least part of a thickness direction.

12. The data storage and retrieval system of claim 8, wherein the base is formed from a hard material, at least a portion of each of the first overhangs is formed from a soft material that is softer than the hard material of the base, and the second overhangs are formed entirely from the hard material of the base.

13. The data storage and retrieval system of claim 12, wherein the soft material of said at least a portion of each of the first overhangs is elastomeric.

\* \* \* \* \*

UNITED STATES PATENT AND TRADEMARK OFFICE
CERTIFICATE OF CORRECTION

PATENT NO. : 6,661,604 B2
DATED : December 9, 2003
INVENTOR(S) : Hashizume et al.

It is certified that error appears in the above-identified patent and that said Letters Patent is hereby corrected as shown below:

<u>Column 10,</u>
Line 47, replace "as shown in FIG. 5A." with -- as shown in FIG. 8A. --.

Signed and Sealed this

Seventh Day of March, 2006

JON W. DUDAS
*Director of the United States Patent and Trademark Office*